United States Patent [19]

Kervagoret

[11] Patent Number: 4,962,975
[45] Date of Patent: Oct. 16, 1990

[54] HYDRAULIC BRAKE CIRCUIT FOR A MOTOR VEHICLE EQUIPPED WITH A WHEEL ANTI-LOCK DEVICE

[75] Inventor: Gilbert Kervagoret, Argenteuil, France

[73] Assignee: Bendix France, Drancy, France

[21] Appl. No.: 504,077

[22] Filed: Apr. 2, 1990

Related U.S. Application Data

[63] Continuation of Ser. No. 339,909, Apr. 17, 1989, abandoned, which is a continuation of Ser. No. 159,620, Feb. 23, 1988, abandoned.

[30] Foreign Application Priority Data

Feb. 26, 1987 [FR] France .................... 87 02539

[51] Int. Cl.⁵ .................................. B60T 8/32
[52] U.S. Cl. ........................... 303/116; 303/119
[58] Field of Search ............ 303/110, 113, 114, 115, 303/116, 117, 119, 118; 188/181 A

[56] References Cited

U.S. PATENT DOCUMENTS

| | | | |
|---|---|---|---|
| 3,532,391 | 10/1970 | Klein | 303/116 X |
| 3,549,212 | 12/1970 | Leiber | 303/116 |
| 3,614,055 | 10/1971 | Douglas | 303/115 X |
| 3,825,306 | 7/1974 | Fink | 303/113 |
| 3,866,983 | 2/1975 | Kondo | 303/119 |
| 3,975,061 | 8/1976 | Kondo et al. | 303/10 X |
| 4,129,341 | 12/1978 | Pauwels | 303/115 X |
| 4,182,536 | 1/1980 | Pauwels | 303/115 |
| 4,395,073 | 7/1983 | Arikawa et al. | 303/119 X |
| 4,445,333 | 5/1984 | Coleman | 137/855 X |
| 4,474,413 | 10/1984 | Farr | 303/116 |
| 4,627,671 | 12/1986 | Matsui et al. | 303/111 X |
| 4,640,558 | 2/1987 | Nomura et al. | 303/119 |
| 4,730,879 | 3/1988 | Adachi et al. | 303/116 |
| 4,768,932 | 9/1988 | Geberth, Jr. | 137/71 X |
| 4,779,935 | 10/1988 | Kuwana et al. | 303/116 |

FOREIGN PATENT DOCUMENTS

| | | | |
|---|---|---|---|
| 2444765 | 4/1976 | Fed. Rep. of Germany | 303/116 |
| 3147149 | 10/1982 | Fed. Rep. of Germany . | |
| 2056606 | 3/1981 | United Kingdom | 303/116 |
| 2071245 | 9/1981 | United Kingdom . | |
| 2163503 | 2/1986 | United Kingdom . | |
| 2161231 | 9/1986 | United Kingdom . | |
| 2187521 | 9/1987 | United Kingdom | 303/116 |
| 1357286 | 12/1987 | U.S.S.R. | 303/116 |

Primary Examiner—Douglas C. Butler
Attorney, Agent, or Firm—Larry J. Palguta; Ken C. Decker

[57] ABSTRACT

The invention relates to the braking of a motor vehicle. During periods when the anti-lock device is in operation, pressure pulses occur in the brake circuit. To prevent these pressure pulses from being transmitted to the master cylinder, a non-return valve (11) is arranged in the circuit so as to prevent any return of the brake fluid into the master cylinder during periods of anti-lock braking. The non-return valve (11) is closed as a result of the pressure of the fluid from the accumulator (24), itself fed by the pump (23) which is started up by the computer of the anti-lock device at the same time as the expansion of the brake fluid is controlled by the solenoid valve (16). At the end of the braking period when the petal (3) is released, the fluid in the brake circuit can return into the master cylinder via the line (28) and the non-return valve (12). The invention is used for eliminating pulses in the brake pedal during the periods when the anti-lock device is in operation.

7 Claims, 3 Drawing Sheets

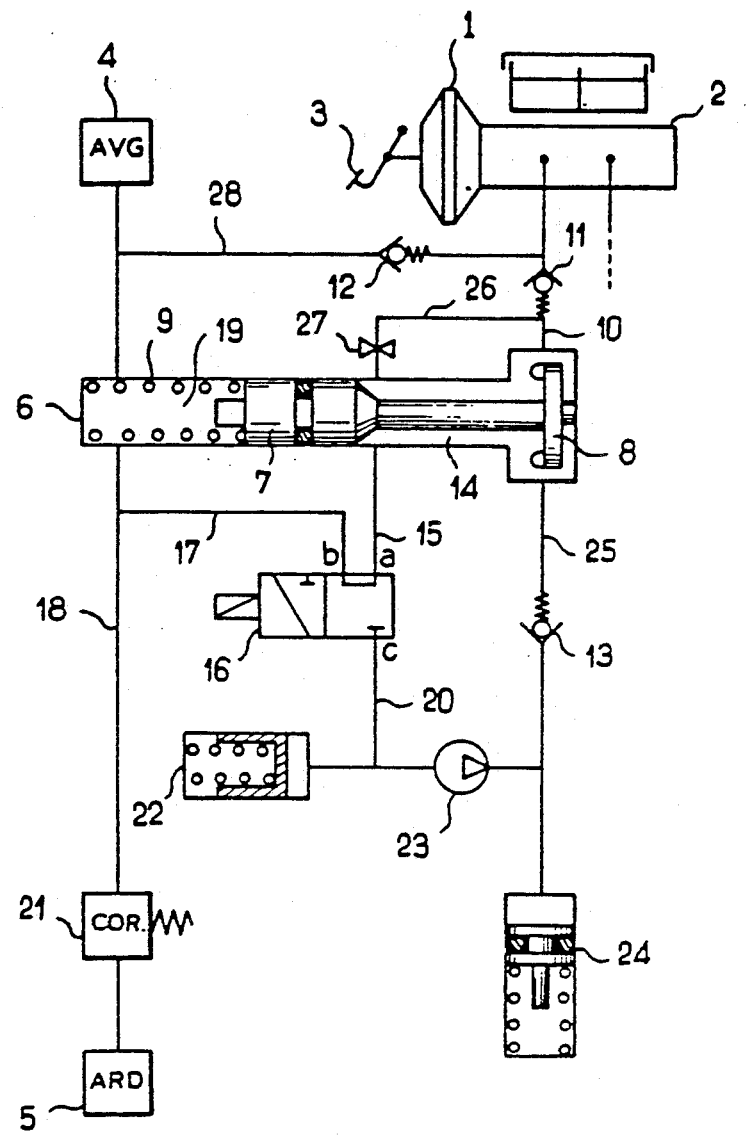
FIG_1

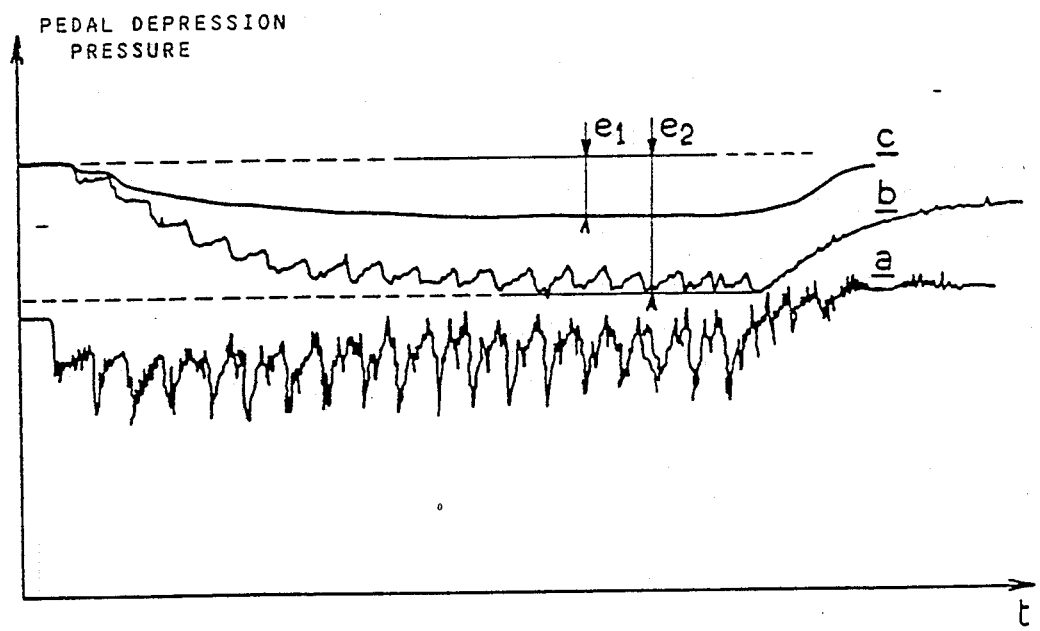
FIG_2

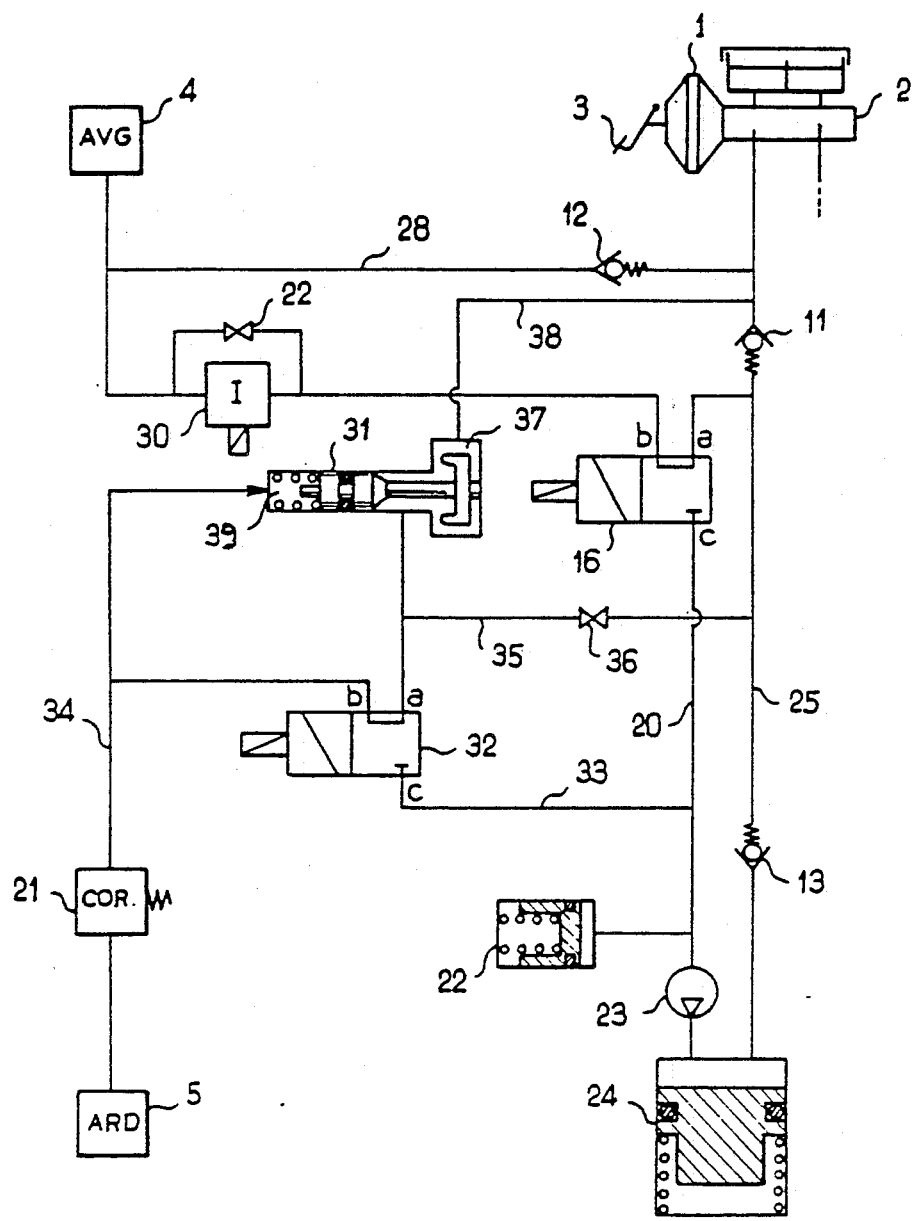
FIG_3

HYDRAULIC BRAKE CIRCUIT FOR A MOTOR VEHICLE EQUIPPED WITH A WHEEL ANTI-LOCK DEVICE

This is a continuation of abandoned application Ser. No. 339,909 filed Apr. 17, 1989, which is a continuation of abandoned application Ser. No. 159,620 filed Feb. 23, 1988.

The present invention relates to a hydraulic brake circuit for a motor vehicle equipped with a wheel anti-lock device and, more particularly, to such a circuit, in which the anti-lock device is designed so that it can simply be superimposed on a conventional hydraulic brake circuit.

During phases when such a circuit is operating with anti-locking, the vehicle driver detects oscillations of the brake pedal which correspond to the periods of intake and expansion of brake fluid in the brakes. These oscillations surprise the unwary driver and can even prove troublesome, above all on ground with a poor wheel grip.

European patent application No. 180,156 makes known a wheel anti-lock control device designed to overcome this disadvantage. This device comprises an arrangement of pressure sources and solenoid valves which are each controlled via one output of a computer. However, the embodiments described in this patent application use such a large number of solenoid valves that they are relatively costly to produce.

It is therefore an object of the present invention to provide a hydraulic brake circuit for a motor vehicle equipped with a wheel anti-lock device, this circuit being designed to filter, by simple means cheap to produce, the reactions on the brake pedal of the pressure variations of the brake fluid during anti-lock operation.

According to the invention, there is provided a hydraulic brake circuit for a motor vehicle equipped with a wheel anti-lock device, this circuit comprising a master cylinder actuated by means of a servo brake controlled by a pedal, at least one brake associated with a wheel of the vehicle, and a normally closed solenoid valve located in the brake circuit and, under the control of the anti-lock device, for reducing the pressure in the wheel brake by putting the latter in communication with means for storing the brake fluid of the circuit. The circuit according to the invention comprises a filtering element or first non-return valve for isolating the master cylinder from the pressure pulses in the circuit during a period of operation of the anti-lock device, and a second non-return valve located upstream of the first valve in a branch of the circuit connected between the outlet of the wheel brake and that of the master cylinder, in order to allow the fluid to return into the master cylinder when pressure on the brake pedal is relaxed.

The invention will now be described by way of example with reference to the accompanying drawings in which:

FIG. 1 is a diagram of a first embodiment of the hydraulic brake circuit according to the invention, FIG. 2 is a graph illustrating the filtering of the reactions on the pedal which is obtained by means of the circuit of FIG. 1, and FIG. 3 is a diagram of a second embodiment of the brake circuit according to the invention.

Reference will be made to FIG. 1, where the brake circuit illustrated consists of two perfectly symmetrical half-circuits. Only one of these half-circuits will therefore be described below. Conventionally, each half-circuit controls the braking of two crossed wheels of the vehicle, such as, for example, the front left-hand wheel and the rear right-hand wheel for one of the half-circuits. The brake circuit illustrated is also of the type in which the anti-lock device is designed simply to be superimposed on a conventional brake circuit. The latter is associated with a servo brake coaster 1 and with a master cylinder 2, the assembly as a whole being controlled by the driver by means of a pedal 3. The half-circuit to be described serves for controlling the pressure of a brake fluid in a front left-hand wheel brake 4 and in a rear right-hand wheel brake 5. The master cylinder is connected to the wheel brakes via lines passing through a pilot-controlled valve 6 and through a three-way two-position solenoid valve 16. The pilot-controlled valve 6 comprises a plunger 7, the head 8 of which is loaded into an open position by a spring 9 acting on the end of the plunger opposite that carrying the head. The master cylinder 2 is connected to a chamber 14 of the valve, surrounding the plunger head, via a line 10. According to the invention, for reasons which will be explained later, this line 10 contains a filtering element or non-return valve 11 mounted so as to prevent the brake fluid from returning from the valve 6 towards the master cylinder 2. The chamber 14 surrounding the head 8 of the plunger 7 of the valve 6 is connected to the inlet a of the solenoid valve 16 via a line 15. This solenoid valve is a conventional three-way two-position solenoid valve. In one of the two positions, the inlet a is connected to the inlet b, itself connected, via a line 17, to a line 18 which feeds the wheel brakes 4 and 5. The line 18 enters a chamber 19 of the pilot-controlled valve 6, and in this chamber is arranged the spring 9 which loads the plunger 7. Thus, the position of the head of the plunger is controlled not only by the load exerted on it by the spring 9, but also by the difference in the pressures prevailing in the chambers 14 and 19. This chamber 19 is located between the line 17 and the front left-hand wheel brake 4. Moreover, the line 18 feeds the rear right-hand wheel brake 5 by way of a conventional pressure corrector 21.

During a normal braking phase, when the driver has pressed the brake pedal 3 the pressure of the brake fluid in the master cylinder 2 increases, and this pressure increase is transmitted, via the lines 10, 15, 17 and 18, to the two wheel brakes 4 and 5 by means of the pilot-controlled valve 6, then open, and the solenoid valve 16 which is in a position shutting off the flow to the low-pressure accumulator 22, as shown in the Figure.

The circuit according to the invention is equipped with a wheel anti-lock device. This device comprises a computer (not shown) which controls the position of the solenoid valve 16. When the computer detects that locking of the wheels is imminent, it controls the changeover of the solenoid valve 16 into an expansion position, in which the inlets b and c communicate with one another, in order to allow the fluid contained in the brakes to flow into a line 20 which is thus connected to the line 17. This fluid is then received in a low-pressure accumulator 22. An electric pump 23 takes up this fluid and conveys it into a high-pressure accumulator 24 connected to the pump outlet. The accumulators 22 and 24 form, together with the pump 23, means of storing the fluid of the circuit. The accumulator 24 is connected to the chamber 14 of the valve 6 via a line 25, in which is located a non-return valve 13 which prevents the brake fluid from flowing from the chamber 14 towards the accumulator 24. When the plunger head 8 of the valve 6 is closed, the chamber 14 is divided into two compartments connected to one another by means of a bypass 26 which has a restriction 27. One end of this bypass is connected to the circuit between the chamber 14 and the filtering element or non-return valve 11.

The circuit according to the invention also possesses a line which connects the master cylinder, upstream of the valve 11, directly to the line 18 upstream of the wheel brake 4. According to the invention, this line 28 contains a non-return valve 12 oriented in such a way as to prevent a flow of fluid along this line 28 from the master cylinder towards the line 18. The function of the valve 12 and of the line 28 will be explained later.

As was seen above, when the computer detects that locking of the wheels is imminent, the solenoid valve 16 changes to the "expansion" position which makes it possible to reduce the pressure of the brake fluid in the volume $C_1$. The plunger 7 then closes on its seat under the effect of the differential pressure exerted on this plunger. Furthermore, the computer starts up the electric pump 23 at the same time as it causes the solenoid valve 16 to change to the "expansion" position. As soon as the computer cuts off the energization of the solenoid valve 16, the electric pump 23 once again boosts the brake circuit via the chamber 14 of the valve 6 and the restriction 27, the solenoid valve 16 then being in the "isolating" position which puts its inlets a and b in communication with one another so as to feed brake fluid to the line 18. As is customary, the restriction 27 moderates the rising pressure of the fluid in the brake circuit. Some of the brake fluid is then received in the high-pressure accumulator 24.

When the computer starts up the pump, the driver detects a slight depression of the pedal 3. In fact, the pump 23 takes some time to be primed, and the master cylinder 2 must then, via the non-return valve 11, supply the chamber 14 of the valve 6 with the missing brake fluid as a result of a movement of the plunger 7. After that, the accumulated pressure of the fluid in the accumulator 24 acts on the non-return valve 11 to close the latter, thus isolating the master cylinder from any variation in the pressure prevailing in the circuit downstream of the non-return valve 11. The alternating sequence of intakes and expansions of the brake fluid is then no longer detected by the driver when the anti-lock device is in operation. According to the invention, since the non-return valve 11 is then closed, the brake fluid is returned into the master cylinder by means of the line 28 via the non-return valve 12, at the end of the braking period.

Reference will be made to the graphs of FIG. 2 which make it possible to assess the effectiveness of the means for filtering the reactions of the brake pedal according to the invention. This Figure shows at a the change in the pressure in, for example, the wheel brake 4 during an anti-lock operating sequence, at b the depression of the brake pedal 3 when a brake circuit not improved as a result of the present invention is used, and at c the depression of this same pedal when the brake circuit improved as a result of the present invention is used. A comparison of the graphs b and c shows at once that the vibrations of the brake pedal observed on the graph b are smoothed completely on the graph c. The circuit according to the invention thus makes it possible to eliminate these vibrations which are both unpleasant for the driver and dangerous for the driving of the vehicle. The graphs b and c also show that, during an anti-lock operating sequence, the depression $e_1$ of the brake pedal in the circuit according to the invention is considerably less than that $e_2$ observed on the brake pedal of the circuit not improved as a result of the present invention. Comparative measurements made by means of a circuit according to that of FIG. 1 and a similar circuit not improved as a result of the invention, made it possible to record an inward stroke of the master-cylinder piston of 1.7 mm with the circuit improved according to the present invention, whereas a corresponding inward stroke of 4.5 mm is recorded when a circuit not improved as a result of the present invention is used. The invention therefore makes it possible to reduce this additional depression of the pedal considerably during an anti-lock braking period, the driver also finding this depression unpleasant.

In the embodiment of FIG. 1, the circuit according to the invention contains valves 11 and 12 which are slightly calibrated (for example, at 0.5 bar). The accumulators 22 and 24 can be spring accumulators.

Reference will now be made to FIG. 3 which illustrates a second embodiment of a brake circuit improved according to the present invention. In this Figure, the elements of the circuit which are identical or similar to corresponding elements of the circuit of FIG. 1 are designated by the same numerals. Since the circuit of FIG. 3 is composed of two identical half-circuits, only one of these will be described below. In the circuit of FIG. 3, the wheel brakes 4 and 5 are controlled independently of one another. For this purpose, three-way two-position solenoid valves 16 and 32 are associated respectively with the wheel brakes 4 and 5. The subcircuit associated with the wheel brake 4 essentially comprises the solenoid valve 16 and an isolating solenoid valve 30 controlled by the computer of the anti-lock device, this solenoid valve 30 allowing the selective connection of a bypass having a restriction 22 to be made. Such a selective connection is especially useful for adjusting the pressure in the front wheel brakes more accurately. Since these wheels are the guiding wheels, it is expedient to give the anti-lock device for these wheels as much flexibility as possible. As regards the subcircuit associated with the wheel brake 4, the non-return valves 11 and 12 perform the same function as in the embodiment of FIG. 1.

The pressure accumulator 24 has an inlet line 20 and an outlet line 25.

The sub-circuit associated with the wheel brake 5 essentially comprises a pilot-controlled valve 31, the three-way two-position solenoid valve 32 and the lines connecting the master cylinder to the wheel brake 5 by means of these two members. The expansion ports c of the solenoid valves 16 and 32 are connected to the low-pressure accumulator 22 and to the inlet of the pump 23 via the lines 20 and 33 respectively. On the isolating side, the solenoid valve 32 is connected, by means of its port b, to the line 34 feeding the wheel brake 5, while it is connected, by means of its port a, on the one hand to the line 25 via a line 35 equipped with a restriction 36 and on the other hand to the chamber 37 which surrounds the head of the plunger of the pilot-controlled valve 31. This plunger, when it is in the closed position, divides this chamber into two compartments. One of these compartments is connected to the master cylinder upstream of the filtering element or non-return valve 11 via a line 38. The closing of the plunger breaks the connection between this line 38 and the line connecting the chamber 37 to the port a of the solenoid valve 32. The foot of the plunger is loaded by a spring seated in a chamber 39, as with the plunger 6 of the embodiment of FIG. 1. A tap allows the brake fluid under pressure in the line 34 to feed the chamber 39.

During a normal braking period, the pressure in the master cylinder is transmitted to the wheel brake 5 via the line 38 and the chamber 37 of the pilot-controlled valve 31 on the one hand, via the line 35 equipped with a restriction 36 on the other hand, and via the solenoid valve 32 which is then in the isolating position. When the computer detects that a state of locking of the wheel associated with the wheel brake 5 is imminent, the solenoid valve changes to the expansion position, as in the embodiment of FIG. 1. However, at the end of the braking period when the pedal 3 is released, it is necessary to ensure that the fluid contained in the wheel brake 5 returns towards the master cylinder. For this purpose, according to the invention, the plunger of the solenoid valve 31 opens under the effect of the pressure variation in the chamber 39, the effect of this being to restore communication between the line 34 and the master cylinder via the chamber 37 of the pilot controlled valve and the line 38, the solenoid valve 32 then being in the isolating position once again. The pilot-controlled valve 31 then performs the function of the valve 12 associated with the sub-circuit feeding the wheel brake 4.

Thus, as a result of the invention, the pressure pulses in the brake circuit during the phases of anti-lock braking of the wheels are not transmitted to the master cylinder and therefore to the brake pedal. The driver's comfort and braking safety are thereby increased, this being achieved by means of inexpensive modifications made to an anti-lock device designed to be superimposed on a conventional brake circuit. In particular, the non-return valves used make it possible to do without solenoid valves controlled by specialized signals coming from the computer.

What is claimed is:

1. A hydraulic brake circuit for a motor vehicle equipped with a wheel anti-lock device, the circuit comprising a master cylinder controlled by a pedal, at least one wheel brake associated with a wheel of the vehicle, a filtering element for isolating the master cylinder from pressure pulses generated in the circuit during the operation of the anti-lock device, a solenoid valve having first, second, and third inlets, said first and second inlets being connected for normal operation of the brake circuit, and, under control of the anti-lock device, said second and third inlets being connected for reducing fluid pressure in said wheel brake connected to said second inlet by putting the second inlet in communication, through said third inlet, with a first accumulator and an inlet of a pump communicating with a second accumulator and said filtering element, the pump being activated by means of the anti-lock device at the same time as the solenoid valve so that fluid pressure in said second accumulator causes said filtering element to be closed and consequently the master cylinder to be isolated, characterized in that the circuit comprises a single spring-operated, pilot-controlled valve sensitive to a reduction in fluid pressure in said wheel brake, said pilot-controlled valve comprising a plunger having a head and one end opposite said head, a first chamber containing the single spring which biases said plunger toward an open position, said first chamber communicating with said wheel brake and with said second inlet of said solenoid valve, and a second chamber containing said head of said plunger, the plunger having movable seal means about the one end to isolate the chambers from one another, the head positioned for closing on a seat to divide the second chamber into first and second fluid compartments, said first fluid compartment having an effective cross-section which is greater than the effective cross-section of said master cylinder, said second fluid compartment being connected to said first inlet of said solenoid valve, the head of the plunger including an abutment portion which abuts a wall of the first fluid compartment when the plunger is in said open position, and a two-way flow restriction being provided for the pilot-controlled valve and communicating with said second accumulator and said second fluid compartment of said second chamber.

2. The hydraulic brake circuit according to claim 1, wherein said filtering element comprises a non-return valve.

3. The hydraulic brake circuit according to claim 1, further comprising a pressure corrector in said circuit for correcting brake pressure communicated with a rear wheel brake.

4. The hydraulic brake circuit according to claim 1, wherein said first fluid compartment is connected to said master cylinder through said filtering element and to said second accumulator, and said first and second fluid compartments are connected together through said restriction.

5. The hydraulic brake circuit according to claim 4, wherein said filtering element comprises a first non-return valve and a second non-return valve is provided in a branch connecting said wheel brake to said master cylinder in order to allow fluid to return into the master cylinder when pressure on the brake pedal is relaxed.

6. The hydraulic brake circuit according to claim 1, wherein the circuit further comprises an isolating solenoid valve in parallel with a fluid restriction such that both communicate with a wheel brake so that activation of said isolating solenoid valve causes restricted fluid flow via the fluid restriction.

7. The hydraulic brake circuit according to claim 6, further comprising a second solenoid valve disposed in said circuit and having a first solenoid inlet connected with a second solenoid inlet for normally communicating with said isolating solenoid valve and fluid restriction, and a third solenoid inlet which under the control of said anti-lock device communicates with said second solenoid inlet for reducing fluid pressure in the associated wheel brake by putting the second solenoid inlet in communication, through said third solenoid inlet, with the first accumulator and the inlet of the pump.

* * * * *